US00RE42385E

(19) United States
(12) Reissued Patent
Wong et al.

(10) Patent Number: US RE42,385 E
(45) Date of Reissued Patent: May 24, 2011

(54) UNIVERSAL USB CHARGING ACCESSORY

(75) Inventors: Yoon Kean Wong, Menlo Park, CA (US); Steven C. Lemke, Sunnyvale, CA (US)

(73) Assignee: Hewlett-Packard Development Company, L.P., Houston, TX (US)

(21) Appl. No.: 11/219,294

(22) Filed: Sep. 2, 2005

Related U.S. Patent Documents

Reissue of:
(64) Patent No.: 6,614,206
Issued: Sep. 2, 2003
Appl. No.: 10/154,881
Filed: May 23, 2002

(51) Int. Cl.
*H02J 7/00* (2006.01)

(52) U.S. Cl. ..... 320/136; 320/111; 320/135

(58) Field of Classification Search ..... 320/107, 320/111, 114, 115, 135, 136, 166; 713/300, 713/310, 340
See application file for complete search history.

(56) References Cited

U.S. PATENT DOCUMENTS 6,050,849 A * 4/2000 Chang ..... 439/536
6,178,514 B1 * 1/2001 Wood ..... 713/300
6,353,894 B1 * 3/2002 Pione ..... 713/340
6,357,011 B2 * 3/2002 Gilbert ..... 713/300
6,362,610 B1 * 3/2002 Yang ..... 323/281
6,498,458 B1 * 12/2002 Chen ..... 320/114
6,833,686 B2 * 12/2004 Veselic et al. ..... 320/128
7,212,420 B2 * 5/2007 Liao ..... 363/146
2002/0195993 A1 * 12/2002 Chiu ..... 320/114
2003/0117104 A1 * 6/2003 Liao ..... 320/107

* cited by examiner

*Primary Examiner* — Edward Tso
(74) *Attorney, Agent, or Firm* — Mahamedi Paradice Kreisman LLP

(57) ABSTRACT

Embodiments of the present invention relate to an apparatus for supplying power to electronic devices, comprising a housing, an electric power source connector coupled to the housing, an electronic circuit enclosed in the housing and electrically coupled to the power source connector, and a universal serial bus connector coupled to the housing and electrically coupled to the electronic circuit, wherein the connector is capable of supplying electrical power to one or more electronic devices for battery charging. The electronic circuit is capable of controlling the charging of the batteries of more than one device and can be enabled to provide data communication between data devices. The apparatus may receive power from a utility power outlet or from another electronic device through the USB connector.

50 Claims, 12 Drawing Sheets

UNIVERSAL USB CHARGING ACCESSORY

Matter enclosed in heavy brackets [ ] appears in the original patent but forms no part of this reissue specification; matter printed in italics indicates the additions made by reissue.

FIELD OF THE INVENTION

The present invention relates to the field of recharging battery-powered electronic devices.

BACKGROUND OF THE INVENTION

As the number of small, portable, electronic devices in daily use have multiplied, so too have the devices used to charge the batteries of these devices. Each new device seems to arrive from the store with a recharging unit, or "brick," in the sales package.

Many modern portable electronic devices are capable of processing data. There are even complete personal area networks comprised entirely of devices that are solely powered by internal batteries.

Such useful devices are commonly found in use by those travelling in the employment of technology concerns. Engineers in high tech often find themselves working in a hotel room with an array of devices, such as a laptop computer, a printer, a scanner and sometimes a cellular phone, all linked together into a personal area network and connected to the internet. Frequently, the same devices that can be linked together by data cables need to link to utility power through their respective recharging units. The result of this need is the requirement that the travelling "road warrior" carries an ever enlarging array of recharging units and cables.

Most modern computers are capable of communicating with peripheral devices by use of the Universal Serial Bus (USB) standard. The USB offers both high speed serial data communication between a wide variety of peripheral and communicating devices as well as a power connection for some devices. Since some portable devices, such as personal data assistants, can accept power through the same USB port through which they communicate to a host computer, a number of devices have begun to emerge with recharging units that recharge through a USB-type port and the devices data cable. However, these devices require a specific recharging unit for each unit being recharged and, when using this system, cannot simultaneously be in communication via the same cable.

Prior art FIG. 1 illustrates a situation encountered often by the modern technology user. A user of more than one modern electronic device currently needs a separate device for powering and recharging the internal battery of each of the necessary devices in use. Laptop computer 101, for example, requires power supply 111 and its associated cable. Portable handheld computer 105, which here can also mean a personal data assistant (PDA), requires power supply and cable 115. Cellular phone 106 requires charger 116 and calculator 107 requires charger 117. Even electric razor 108 can have an internal, rechargeable, battery and thus require recharger 118. The result of the need for multiple power supplies, especially when travelling, is a tangle of cables and an array of power supplies whose population equals the number of useful devices carried and used.

What is required is an apparatus or system that can reduce the need for multiple charging systems in a suite of portable electronic devices. Such an apparatus should be able to charge a wide variety and large number of electronic devices and should use existing mechanical and electrical hardware to a large extent.

SUMMARY OF THE INVENTION

Disclosed herein is a device power and recharge apparatus that uses the power output capability of the universal serial bus port to provide device power to a large number and variety of electronic devices. The power and recharge apparatus can simultaneously allow for data communication through the same port and perform as a hub for a personal area network when connected to the appropriate devices. The power and recharge apparatus can take power from computer ports as well as from utility power sources.

Embodiments of the present invention relate to using a dedicated charging USB hub-device to charge a portable electronic device using a standard electrical and mechanical interface. This plug-in transformer/hub may be used in conjunction with any notebook or desktop computer and various other USB devices. The travelling user can equip himself with several USB charging cables for his small rechargeable gadgets, which can recharge his cellular phone, or other similar products available for handheld devices. When travelling light, the user need only carry his USB charger cables and his notebook computer. The notebook computer can recharge any or all of his other devices. If a personal area network hub is needed, the user can also use the plug-in transformer/hub. The hub need not be plugged in since the notebook can provide power to each device. If the user happens to be located near a utility power outlet, then the transformer/hub can be plugged into the wall, and the USB recharger cables connected to the devices which need to be recharged. The notebook computer need not be connected, since the USB cables and the transformer/hub can be used solely to recharge the devices.

More specifically, embodiments of the present invention relate to an apparatus for supplying power to electronic devices, comprising a housing, an electric power source connector coupled to the housing, an electronic circuit enclosed in the housing and electrically coupled to the power source connector, and a universal serial bus connector coupled to the housing and electrically coupled to the electronic circuit, wherein the connector is capable of supplying electrical power to one or more electronic devices for battery charging. The electronic circuit is capable of controlling the charging of the batteries of more than one device and can be enabled to provide data communication between data devices. The apparatus may receive power from a utility power outlet or from another electronic device through one of the USB connectors.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation and components of this invention can be best visualized by reference to the drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
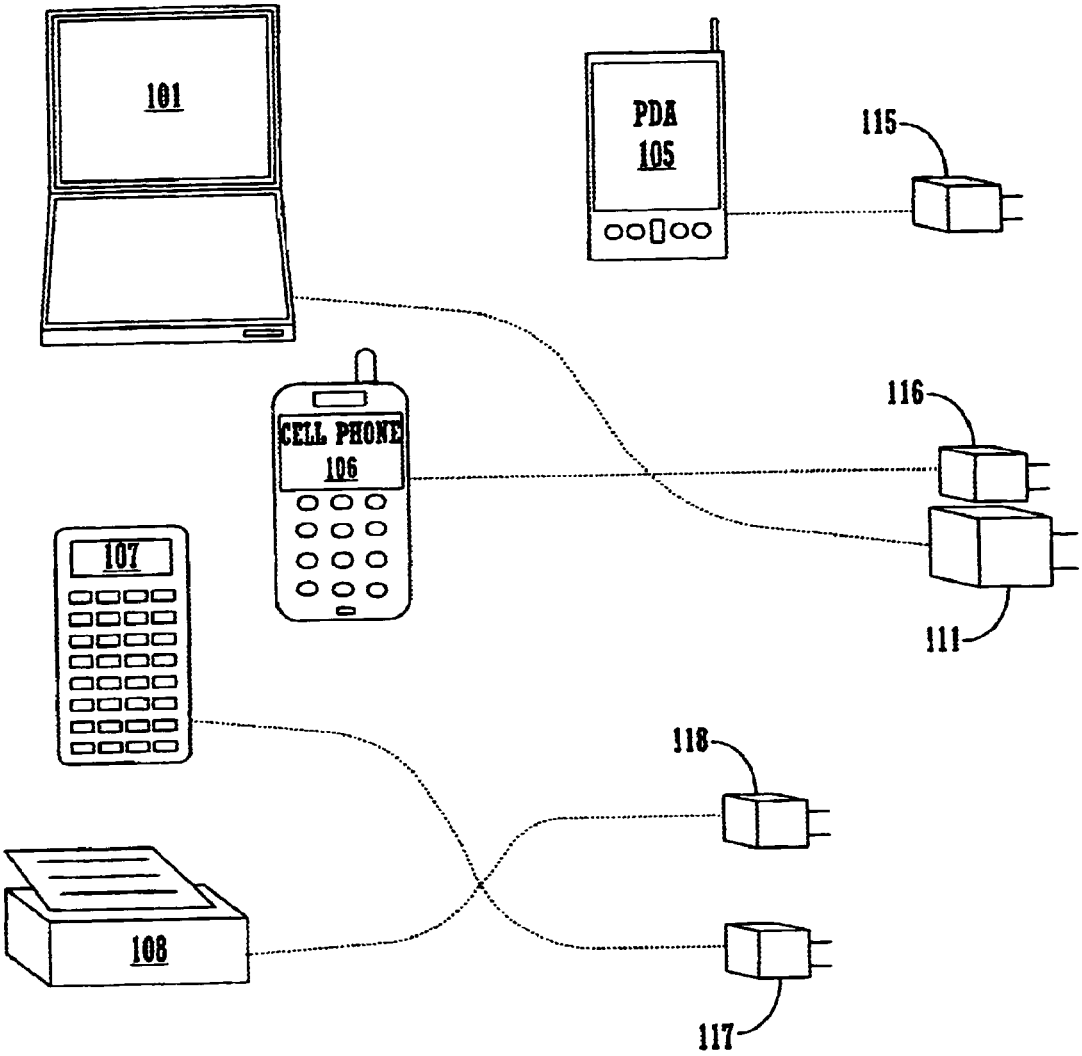
FIGURE 1 (Prior Art)
FIG. 1 (prior art) illustrates an array of portable battery-powered devices and their recharging devices.
Figure 2:
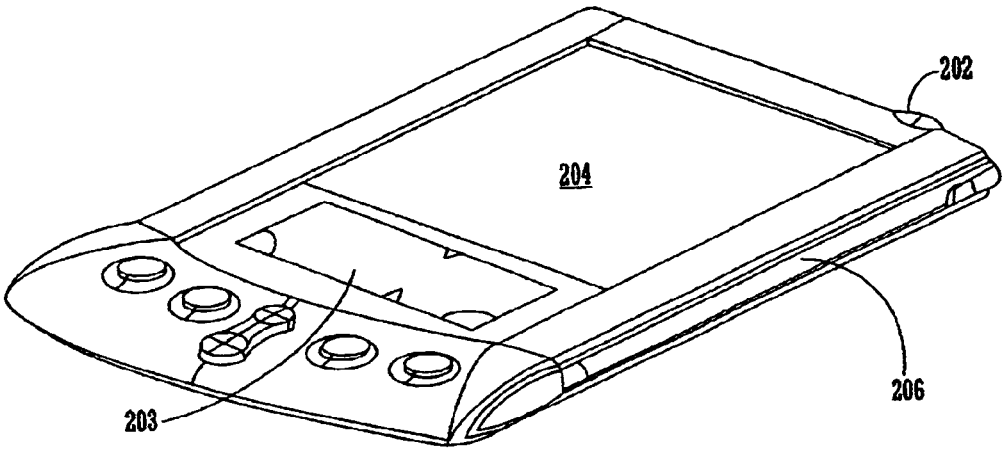
FIG. 2 illustrates a physical embodiment of a portable computer system in accordance with one embodiment of the present invention.
Figure 2:
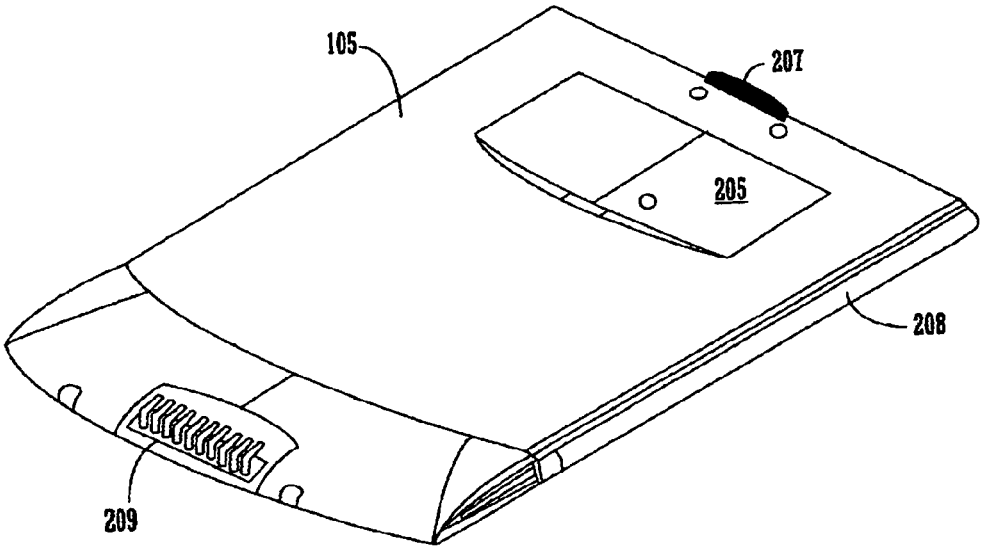

An exemplary handheld portable computing device, 105, is illustrated in FIG. 2. Sometimes known as a personal data assistant (PDA) it is presented here as an example of the type of device that can be powered by rechargeable batteries and also require data communication. Typical handheld portable computing device 105 has a power switch 202, an alphanumeric input element 203, a display element 204, a battery compartment 205 and some form of stylus, 206, or other means for interfacing with alphanumeric input element 203. A typical handheld portable computing device can also include a device for wirelessly communicating data, with networks or other computing devices, such as infrared transmitter/receiver 207 and RF transmitting antenna 208. A handheld portable computing device also typically has a connector, 209, that allows it to communicate data via a cable to a host computer.

Figure 3:
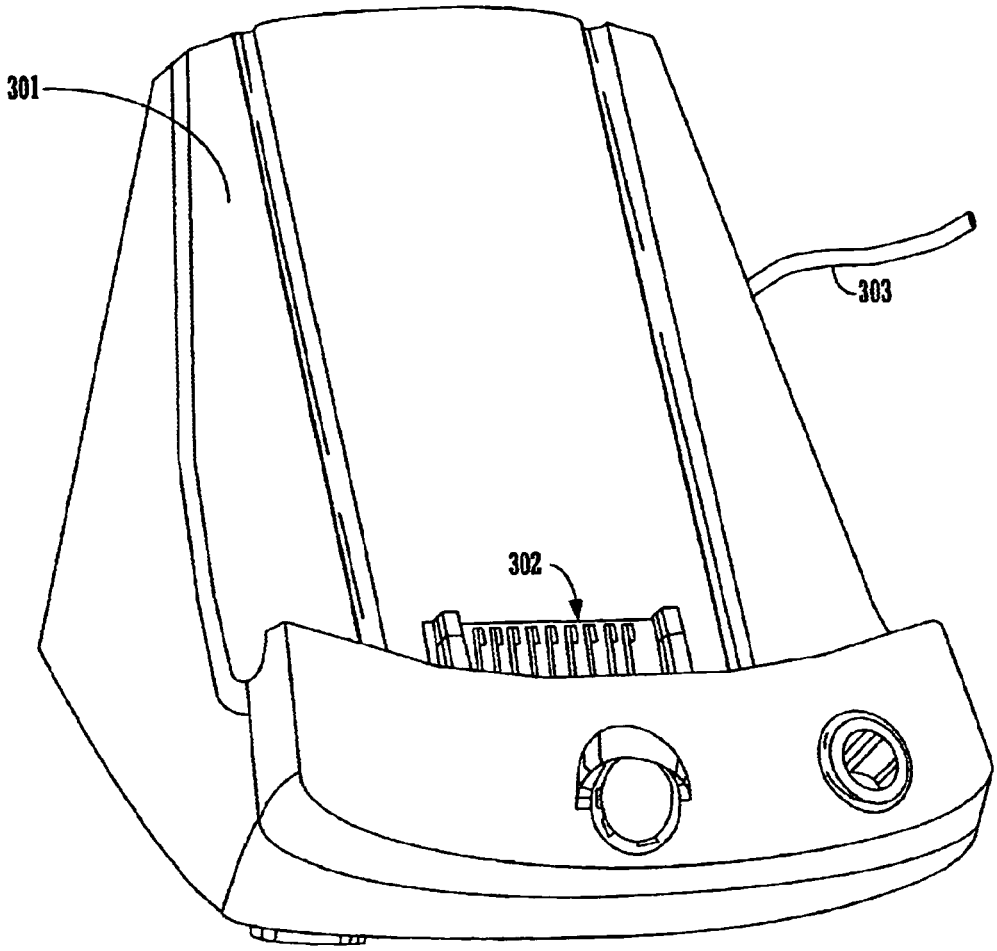
FIG. 3 illustrates a cradle for a hard-wired connection of a typical portable computing device in accordance with one embodiment of the present invention.

The wired communication that is often found between a typical handheld portable computing device, such as a personal data assistant, and a host computer is often enabled by a cradle device such as is shown in FIG. 3. There, cradle 301 holds the handheld portable computing device, which is not shown, while it communicates with a host computer via connector 302 and serial data cable 303. Communication with the host computer can also be performed wirelessly.

The embodiments of the present invention discussed herein relate to a method and a system for recharging rechargeable electronic devices. The electronic devices can be any rechargeable electrical or electronic device that uses a rechargeable battery and can be recharged using power at voltages commonly available or derived from Universal Serial Bus (USB) connectors.

Figure 4:
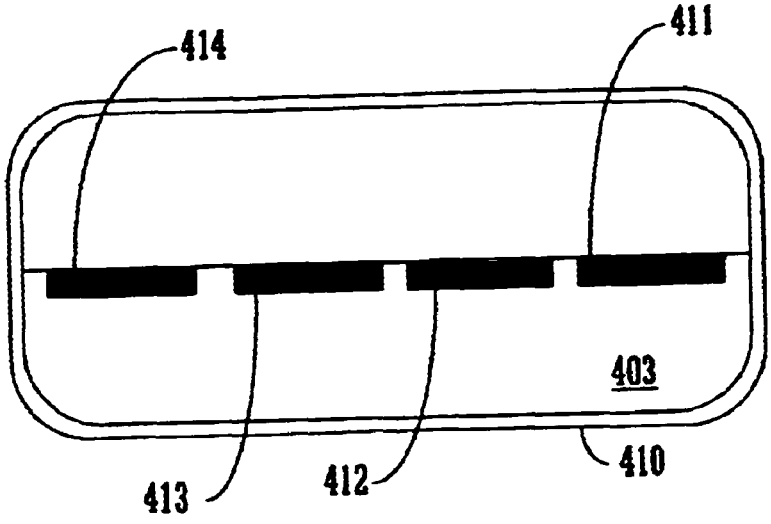
FIG. 4 illustrates a universal serial bus pin-out in accordance with one embodiment of the present invention.
Figure 4:
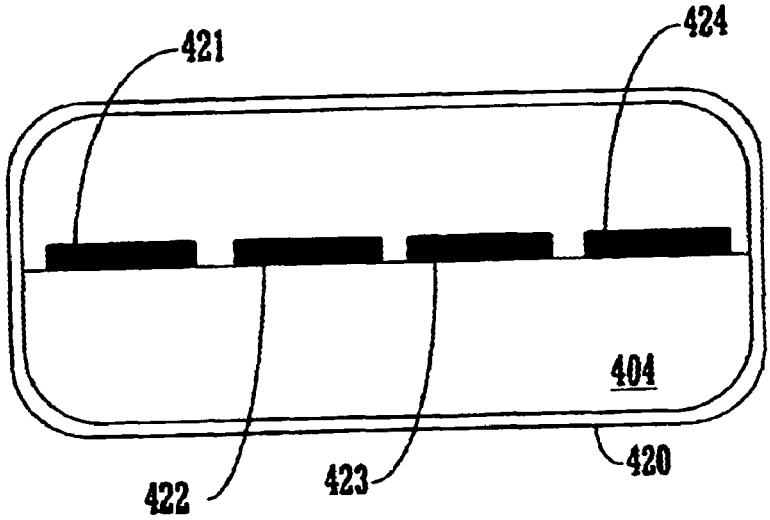

A universal serial bus connector pin-out is illustrated in FIG. 4. Male connector 403, as do all universal serial bus connectors, comprises four conducting pins. Pin 1, at 411, supplies Vcc power, typically +5 volts DC. Pin 2, at 412, is the negative data connection pin and pin 3, at 413, is the positive data connection pin. Pin 4, at 414, supplies a grounding connector. All the pins are contained within housing 410 which is a grounded shield.

Female connector 404 is also contained within a shielding housing, 420. In the female connector, the pins, 1 at 421, 2 at 422, 3 at 423 and 4 at 424, are arranged to affirmatively contact their counterparts in the male connector.

Figure 5:
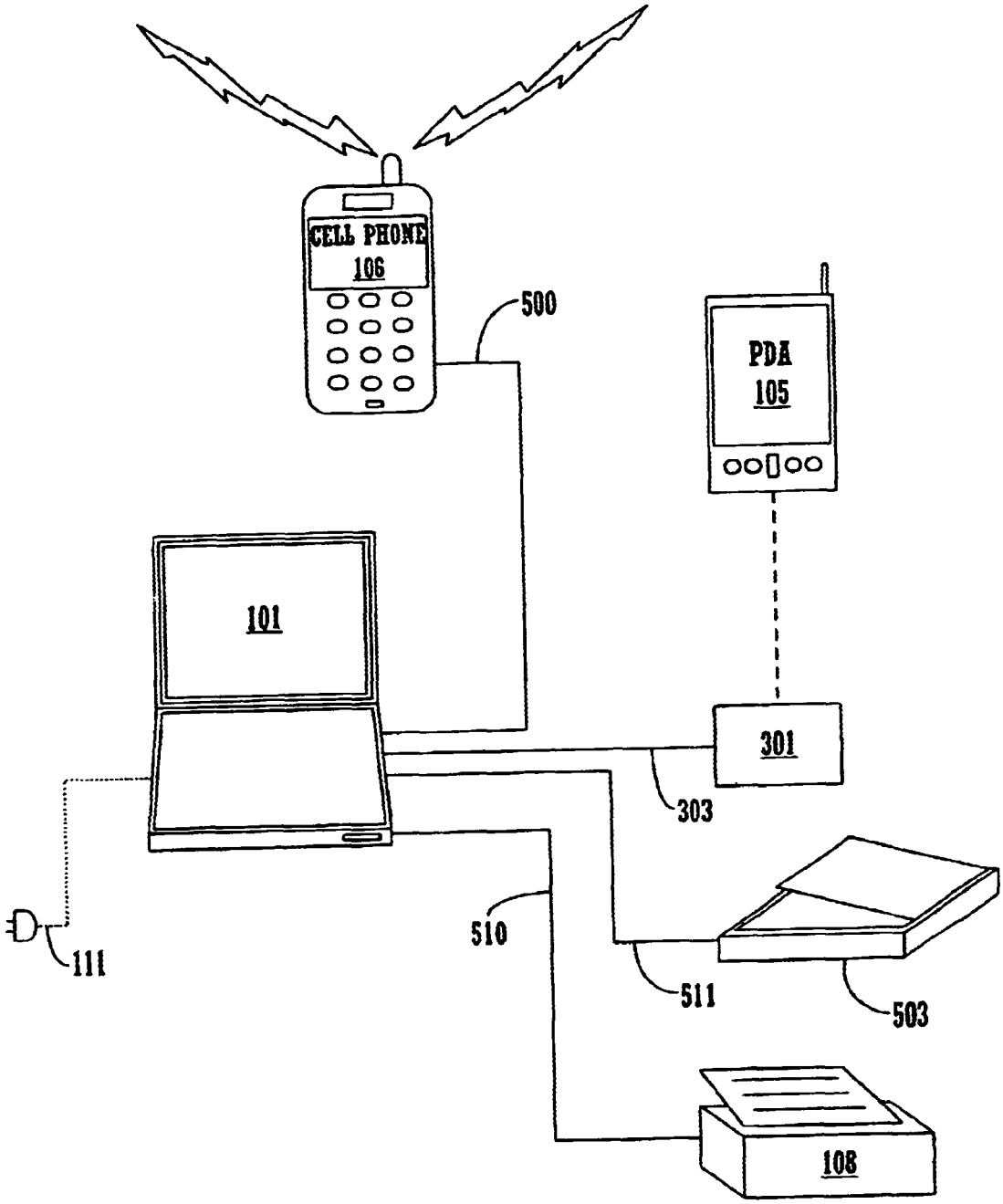
FIG. 5 illustrates a personal area network in accordance with one embodiment of the present invention.

The universal serial bus has emerged as a very widely used standard connection for computer peripherals and other devices that communicate data. FIG. 5 illustrates a personal area network implemented with connections through universal serial bus ports. Laptop computer 101 is shown here hosting scanner 503 and printer 108 as well as cellular phone 106 and PDA 105. Cellular phone 106 is shown communicating via the wireless cellular network and PDA 105 is shown communicating with-its host, laptop 101, via cradle 301 and its associated cable 303.

Note that, in FIG. 5, even though cellular phone 106 is communicating through the wireless cellular network, it is connected to laptop computer 101 via cable 500. In this illustration, cellular phone 106 is enabled to accept a recharge of its battery via a universal serial bus supplied by laptop 101. Laptop computer 101 receives utility power via power cable 111. Communication by laptop 101 with printer 108 is by printer cable 510 and with scanner 503 is by communication cable 511. Universal serial bus communication is capable of replacing each of these communication standard cables.

Figure 6A:
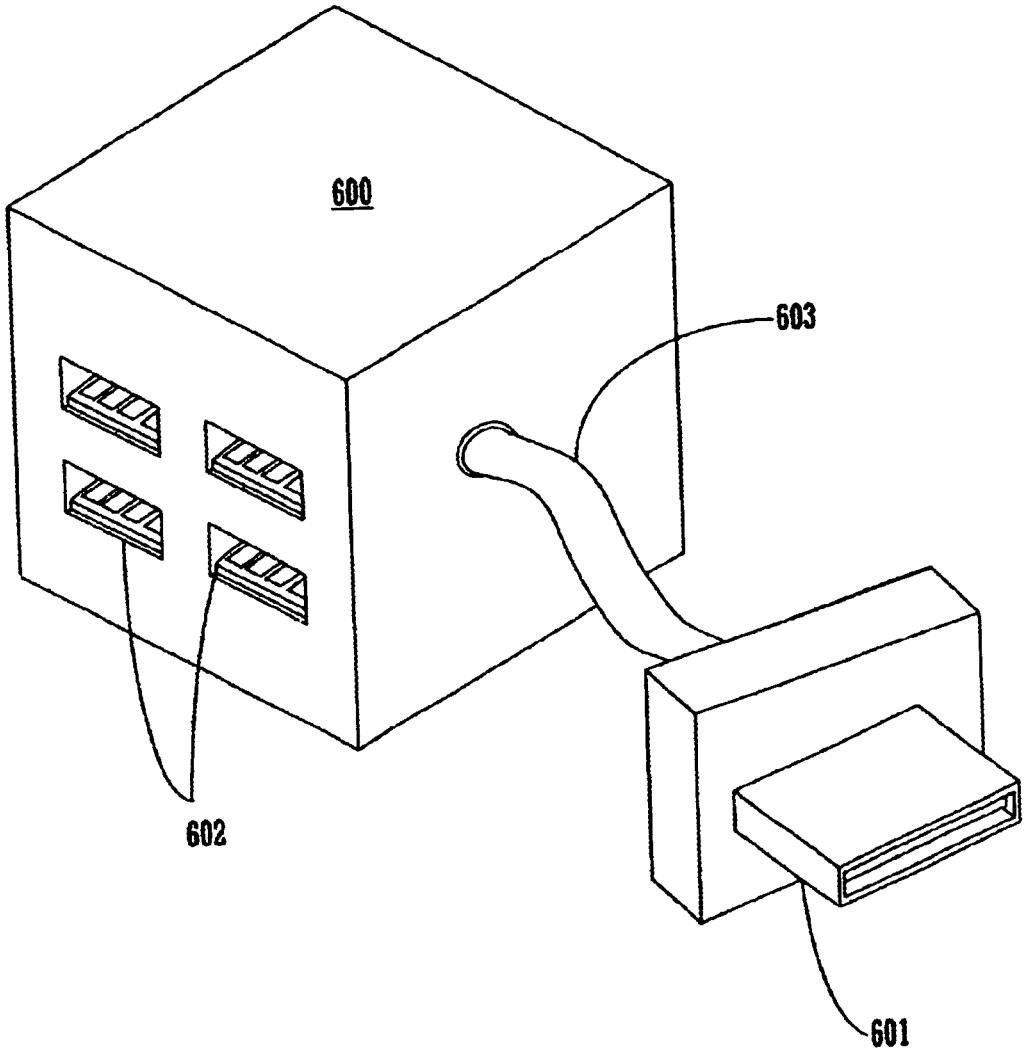
FIG. 6A illustrates a universal, portable, recharging apparatus in accordance with an embodiment of the present invention.

FIG. 6A illustrates one embodiment of the present invention. An accessory recharging apparatus 600 connects to power and data in a host device, such as a computer, through male universal serial bus connector 601 and cable 603. Recharging apparatus 600 also has a plurality of female universal serial bus connectors 602, each one being capable of supplying recharging power to a device enabled to be recharged in such fashion. Recharging apparatus 600 is also enabled to provide universal serial bus data communication between a host device and data-enabled devices coupled to it through the universal serial bus connectors of apparatus 600. Note that receiving power directly from a host device such as a laptop computer can allow the host device to share its battery power with the receiving device when the need arises.

Figure 6B:
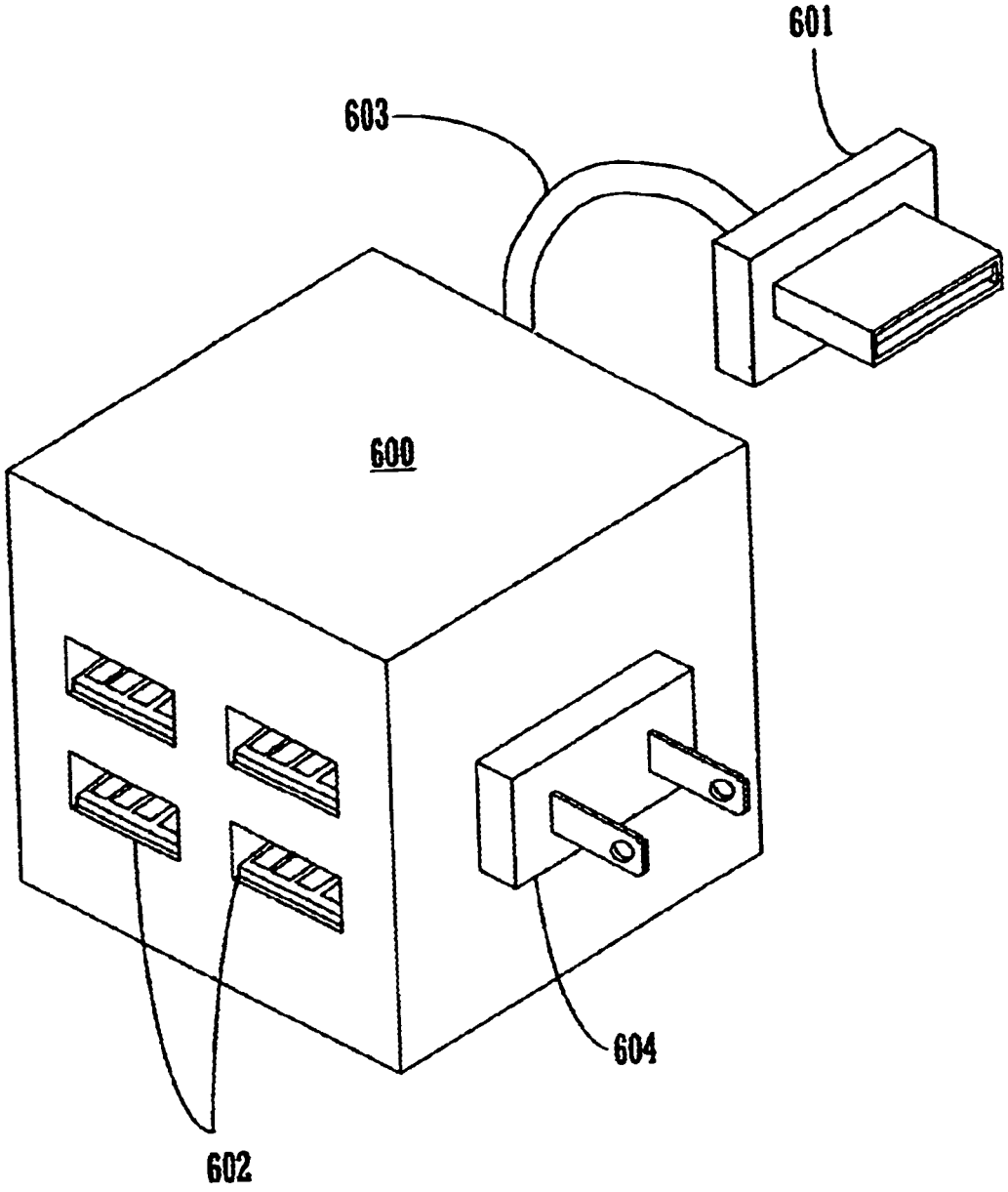
FIG. 6B illustrates a universal, portable, recharging apparatus in accordance with an embodiment of the present invention.

FIG. 6B illustrates another implementation of this embodiment of the present invention wherein recharging apparatus 600 receives power for recharging battery powered devices through utility power plug 604. This implementation of the present embodiment also shows male universal serial bus connector 601. This implementation is capable of charging more power-demanding devices than if it were limited to drawing power directly from a host device. Data communication is enabled via male universal serial bus connector 601 and the female universal serial bus connectors 602.

Note that in this discussion of an embodiment of the present invention, reference is made to apparatus 600 by several terms. It is called variously a charging apparatus, a recharging apparatus, a charging accessory, a transformer, a transformer/hub and other names that all refer to the same device. The variety of names are not used to indicate a difference of embodiment or capability but are used to more correctly indicate the function in the instant discussion of the embodiment.

Figure 7:
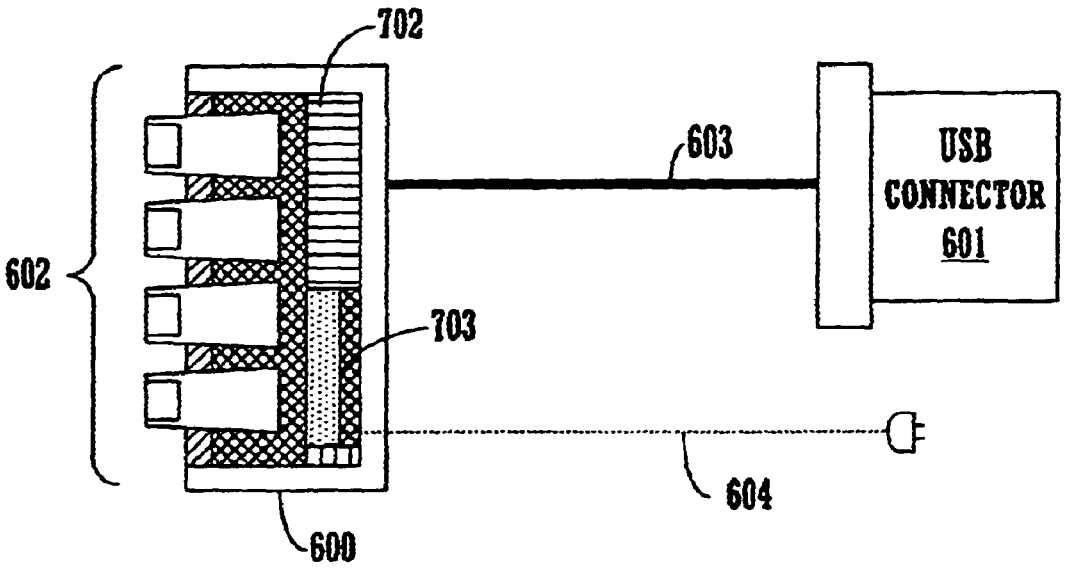
FIG. 7 illustrates a universal, portable, recharging apparatus in accordance with an embodiment of the present invention.

FIG. 7 illustrates one implementation of the internal components in this embodiment of the present invention. Charging accessory 600 comprises a housing that has multiple female universal serial bus connectors 602 mounted to it. Coupled to the connectors is circuit module 702 which is connected to transformer 703 and universal serial bus cable 603. Male universal serial bus connector 601 is connected to universal serial bus cable 603 as shown also in FIGS. 6A and 6B. Utility power connector 604 provides utility power to transformer 703.

Circuitry within this implementation of apparatus 600, illustrated in FIG. 7 as module 702, is capable of controlling the recharging of multiple battery-powered devices simultaneously. It is noted here that, though recharging apparatus 600 is shown here in FIGS. 6A, 6B and 7 as a cubic shape, the illustrated form factor is not limited to that. There many different shapes and sizes that are amenable to implementation in the function of recharging battery powered devices via universal serial bus connectors. The interior arrangement shown in FIG. 7 is also not meant to limit the arrangements in various implementations of this embodiment nor that of other embodiments.

Figure 8:
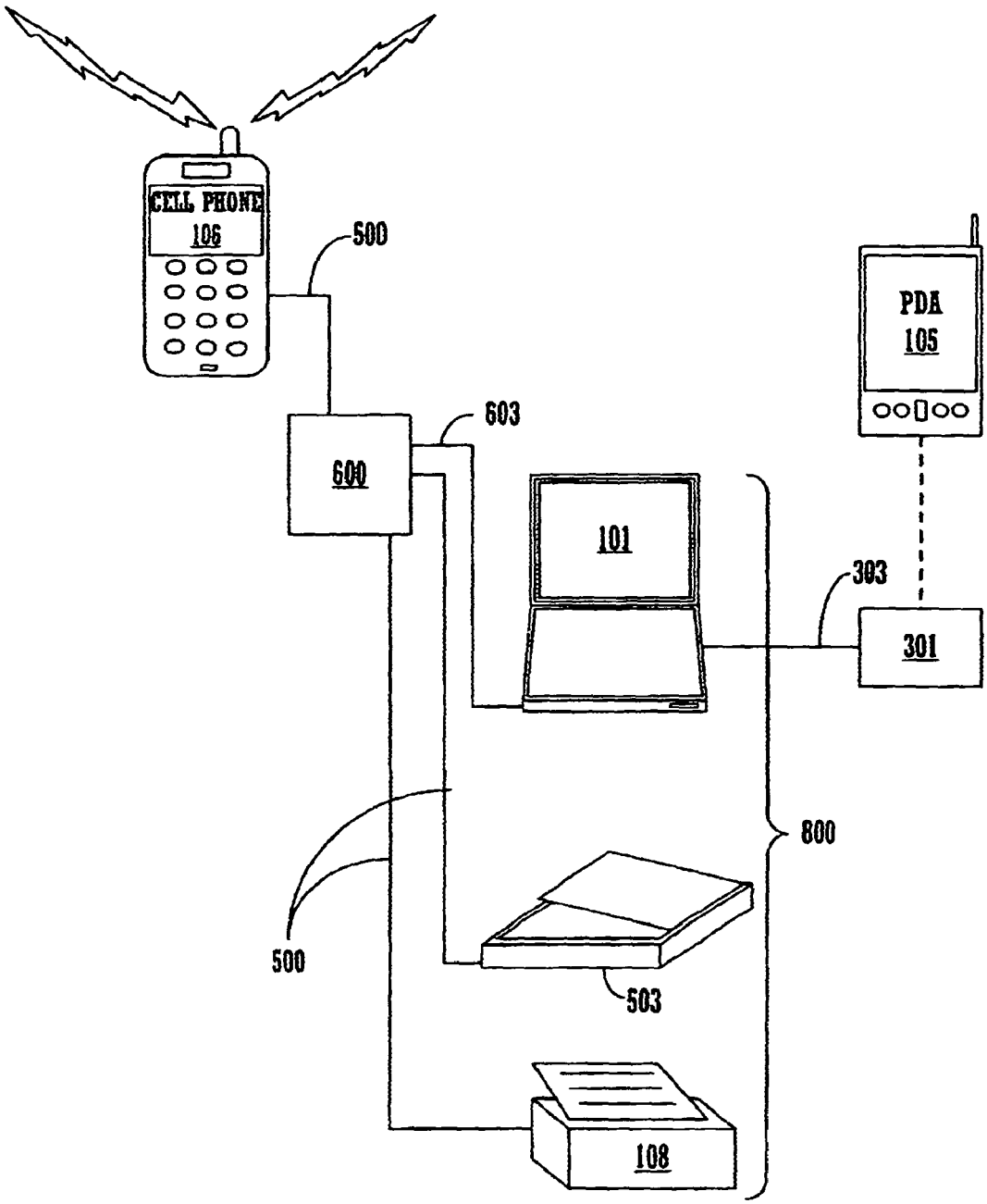
FIG. 8 illustrates an application of one embodiment of the present invention.

FIG. 8 illustrates one use of recharging apparatus 600. Recharging apparatus 600 is shown connected to laptop computer 101, scanner 503, printer 108 and cellular phone 106. Each of these connections is by a universal serial bus cable 500 or, in the case of laptop 101, universal serial bus cable 603. Recharging apparatus 600 receives power from laptop 101 via cable 603 and supplies power to the other devices via universal serial bus cables 500. In the implementation shown, recharging apparatus 600 is enabled as a hub to personal area network 800, comprising laptop 101 and peripherals 503 and 504. In this use, cellular phone 106 could be enabled as a cellular modem, supplying wireless internet connection to the personal area network and communicating with the personal area network 800 through cable 500 and charging hub 600. Also shown in FIG. 8 is PDA 105 communicating with laptop 101 through cradle 301 and associated serial cable 303. In FIG. 8, PDA 105 is not shown taking power via charging accessory 600. Note that, although the term "personal area network" is commonly applied to a small wireless network, it is used here to illustrate the connectedness of the devices shown in communication with each other which are interlinked by cable connections.

Figure 9:
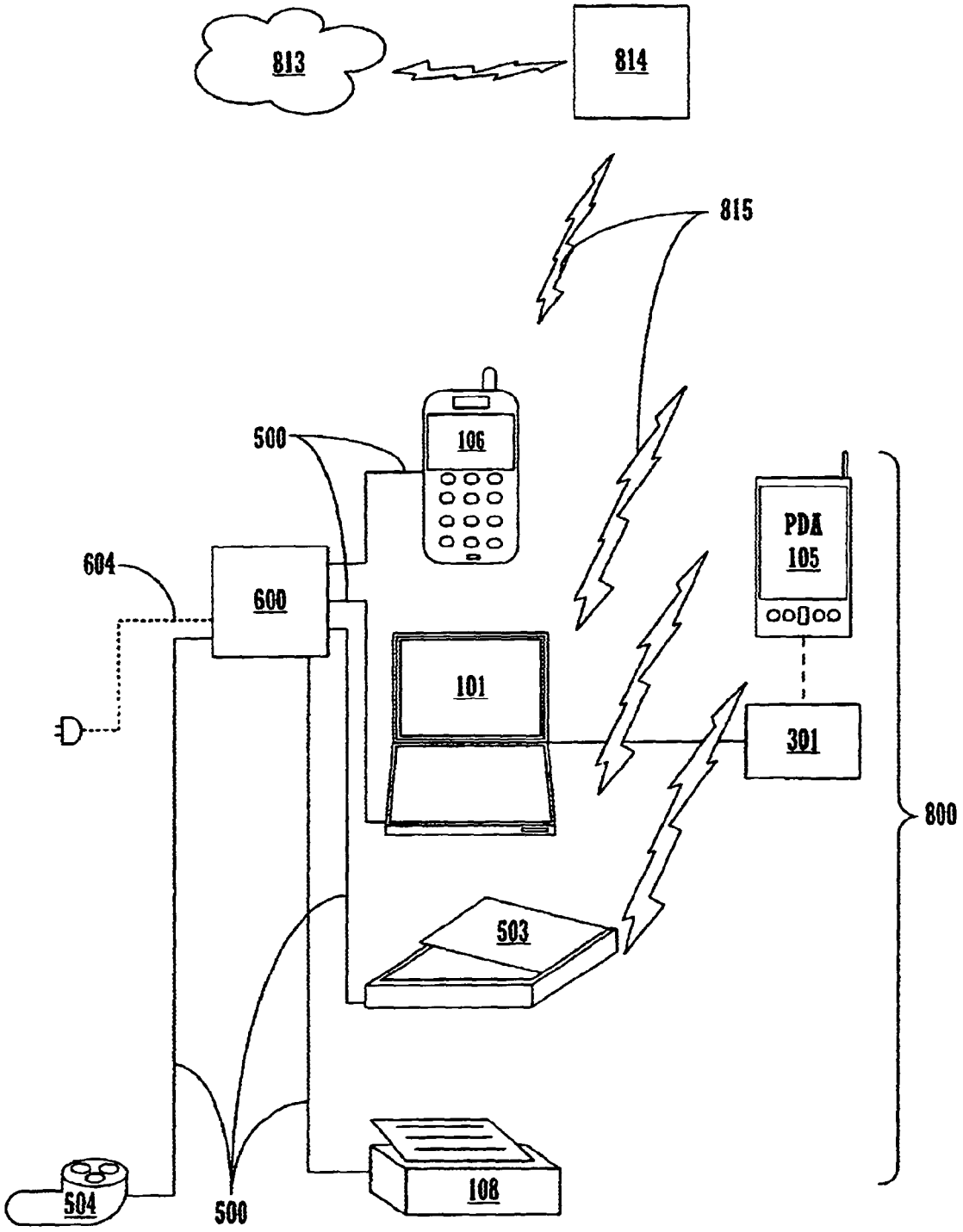
FIG. 9 illustrates an application of one embodiment of the present invention.

FIG. 9 illustrates a wireless personal area network that comprises battery powered devices that include laptop computer 101, cellular phone 106, scanner 503 and printer 108 that all receive power from recharging apparatus 600 via universal serial bus cables 500. The wireless data communication that is inherent in a wireless personal area network is with wireless server 814 via connection 815. A wireless server such as server 814 could also provide connection with internet 813. Charging apparatus 600 receives utility power through utility power connector 604 and, again, controls the output power to the appropriate levels for each of the devices receiving power from it. In this implementation, recharging apparatus 600 is not utilized to provide data communication services even though it is capable of such communication. As in FIG. 8, PDA is shown in wired communication with laptop 101 through cradle 301.

Also shown in FIG. 9 as being connected to recharging apparatus 600 is battery-powered device 504, an electric shaver. Shaver 504 is shown as an exemplary non-data-enabled device that can also be powered and have its batteries recharged via a universal serial bus connection through recharging apparatus 600. If recharging apparatus 600 is enabled as in FIG. 8 as the data hub and power supply for all the battery-powered devices shown, non-data devices such as shaver 504 can be still be recharged simultaneously with data operation in a personal area network such as that shown at 800.

Figure 10:
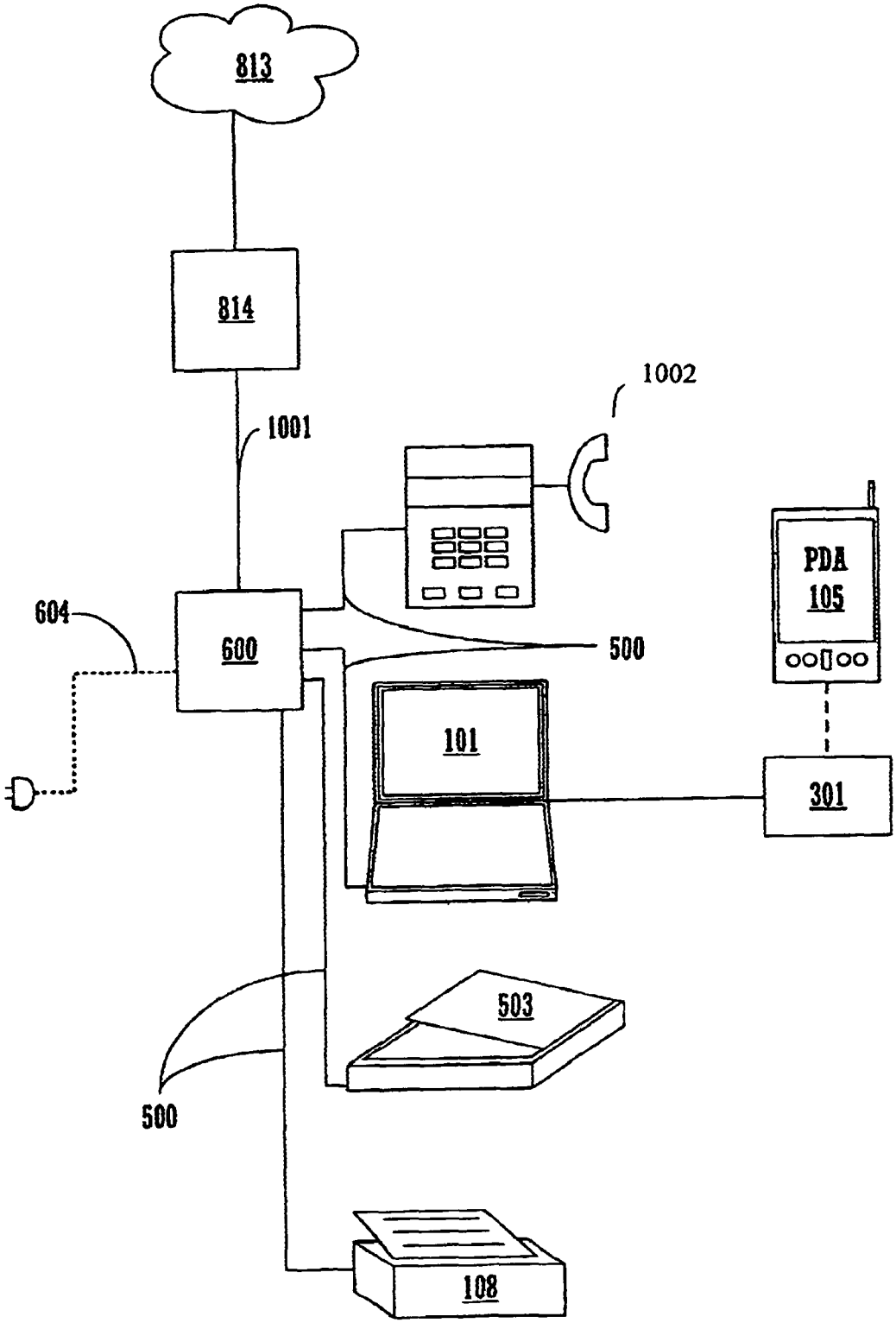
FIG. 10 illustrates an application of one embodiment of the present invention.

Recharging apparatus 600 is used to provide data communication in FIG. 10 where recharging apparatus 600 is implemented as the data and power hub for a wired network similar to that shown in FIG. 8. Here, however, recharging apparatus 600 also provides the communications link to server 814 via a universal serial bus cable, 1001. Recharging apparatus 600 provides data communication and power via universal serial bus cables 500 to voice-over-internet-protocol (VOIP) telephone 1002, laptop computer 101, scanner 503 and printer 108. As in FIG. 9, recharging apparatus 600 receives utility power via utility power connector 604. Also as in FIG. 9, as well as in FIG. 8, PDA 105 is shown in wired communication with laptop 101 through cradle 301.

Figure 11:
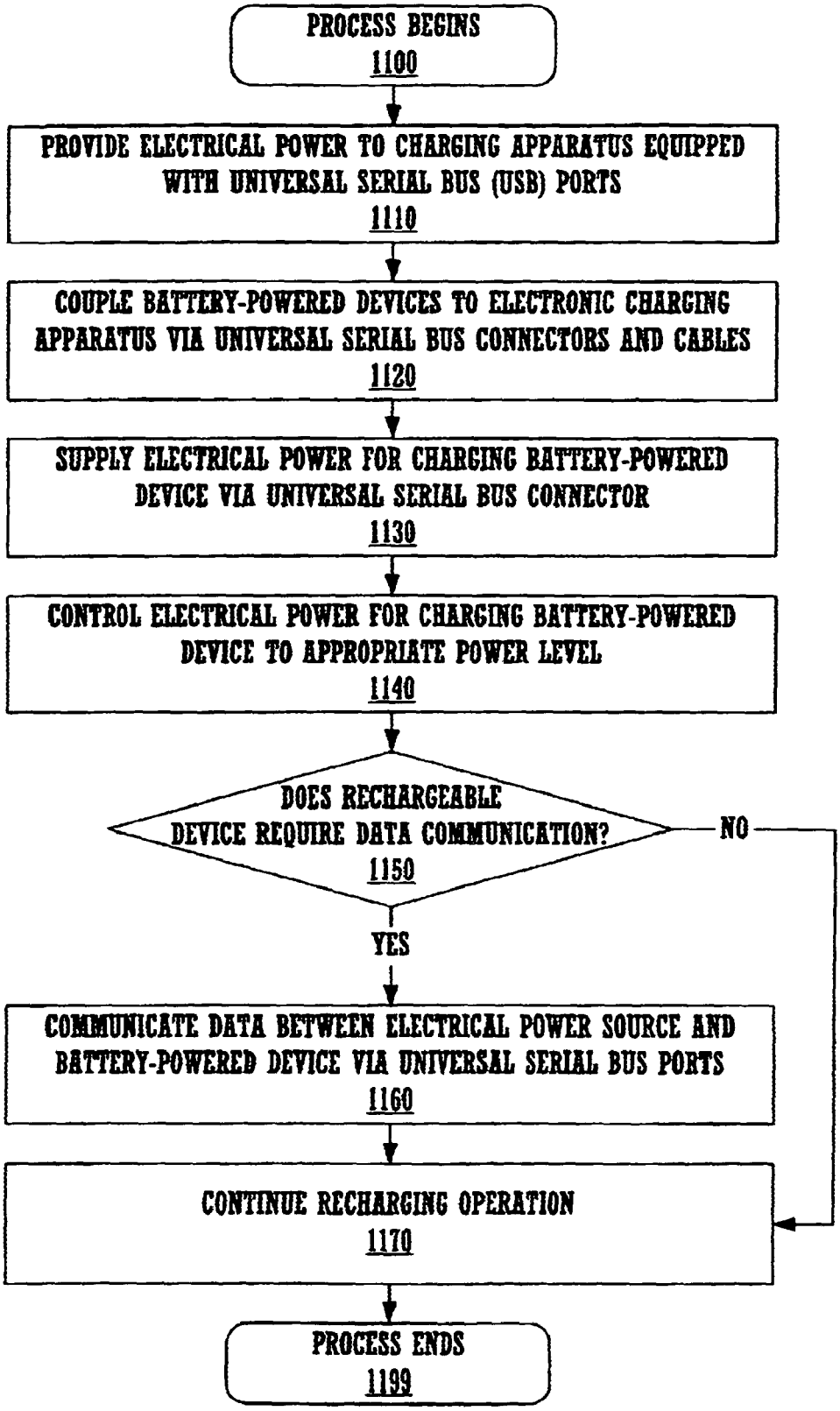
FIG. 11 illustrates a block flow diagram in accordance with one embodiment of the present invention.

FIG. 11 is a block flow diagram that illustrates the process of recharging battery powered devices as discussed above. Process 1100 begins by providing electrical power at 1110 to the recharging apparatus equipped with universal serial bus connectors. A battery powered device needing recharging is connected to a universal serial bus connector on the recharging apparatus at 1120. Electrical power for recharging the battery powered device is supplied at 1130 and controlled to appropriate recharging levels at 1140. If it is intended that the device receiving recharging power also requires data communication, 1150, communication is enabled at 1160. The recharging process continues, 1170, then ending when no longer required, 1199, whether or not data communication continues.

The embodiment of the present invention discussed in this detailed description enables the user to reduce his or her electronic equipment needs significantly by requiring only one device to recharge a possible multitude of battery powered devices. While users who travel frequently are expected to be benefited most by this embodiment, the non-traveling user can also reduce office clutter be reducing to one the number of power supply units required in the wirelessly enabled workplace. While form factors, numbers of devices serviced and other factors can vary widely between conceivable embodiments, all share the ability to supply battery-recharge-level power to multiple devices and to enable data communication between those devices via the universal serial bus protocol.

It must also be noted here that data communication is not necessary within this embodiment. Multiple non-data-enabled devices, such as the electric shaver 504 discussed above, are capable of receiving power and recharging batteries by use of this embodiment. All that is required is that these devices be enabled to accept electrical power by way of a universal serial bus connector.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An electronic charging apparatus, comprising:

a housing;

an electric power source connector coupled to said housing;

an electronic circuit enclosed in said housing and coupled to said electric power source connector; and a plurality of universal serial bus connectors coupled to said housing, wherein said connectors are operable to supply electrical power to electronic devices and wherein said electronic circuit is enabled to control recharging of batteries of said electronic devices.

2. An electronic charging apparatus as described in claim 1, wherein said electric power source connector is a utility power plug.

3. An electronic charging apparatus as described in claim 1, wherein said electric power source connector is a male universal serial bus connector.

4. An electronic charging apparatus as described in claim 1, wherein said plurality of universal serial bus connectors are female universal serial bus connectors.

5. An electronic charging apparatus as described in claim 1, wherein said electronic circuit comprises an electronic data hub.

6. An electronic charging apparatus as described in claim 1, wherein said electronic circuit is operable to control the recharging of multiple battery-powered devices.

7. An electronic charging apparatus as described in claim 6, wherein said multiple battery-powered devices comprise computing devices.

8. A method for charging battery-powered devices, comprising:

providing electrical power to an electronic charging apparatus comprising a plurality of universal serial bus connectors;

coupling said battery-powered devices electronically to respective universal serial bus connectors of said electronic charging apparatus;

supplying electrical power for charging said battery-powered devices from an electrical power source via said universal serial bus connectors; and controlling said electrical power for charging to an appropriate power level by means of circuitry resident in said electronic charging apparatus.

9. A method as described in claim 8, further comprising communicating data between said battery-powered devices over said universal serial bus connectors.

10. A method as described in claim 8, wherein said electrical power source is a utility power outlet.

11. A method as described in claim 8, wherein electrical power from said electrical power source is utility power.

12. A method as described in claim 8, wherein said electrical power source is a universal serial bus port.

13. A method as described in claim 8, wherein electrical power from said electrical power source is computer bus power.

14. A system for charging a rechargeable battery-powered portable electronic device, comprising:

an electrical power source;

an electronic charging apparatus for electrically coupling with said electrical power source and comprising a plurality of universal serial bus connectors, said electronic charging apparatus for supplying battery charging power;

a cable electrically coupled with said electronic charging apparatus and for accepting power from one of said plurality of universal serial bus connectors; and, a rechargeable battery-powered portable electronic device electrically coupled with said cable, wherein said battery-powered portable electronic device is enabled to accept said battery charging power from said electronic charging apparatus by said universal serial bus connector.

15. A system as described in claim 14, further comprising a computer network.

16. A system as described in claim 14 wherein said electrical power source is a utility power outlet.

17. A system as described in claim 14 wherein said electrical power source is a computer.

18. A system as described in claim 14, wherein said battery charging power is at a universal serial bus voltage.

19. A system as described in claim 14, wherein said battery-powered portable electronic device is a laptop computer.

20. A system as described in claim 14, wherein said battery-powered portable electronic device is a computer peripheral device.

21. A system as described in claim 14, wherein said electronic charging apparatus is enabled to communicate data between said plurality of universal serial bus connectors.

22. A system as described in claim 14, wherein said electronic charging apparatus is a computer network hub.

*23. An electronic charging apparatus, comprising:*

*an enclosure;*

*an electric power source connector coupled to said enclosure;*

*an electronic circuit enclosed in said enclosure and coupled to said electric power source connector, wherein said electronic circuit is enabled to control recharging of a battery-powered device; and*

*a universal serial bus connector coupled to said enclosure, wherein said universal serial bus connector is operable to supply electrical power to said battery-powered device.*

*24. The electronic charging apparatus of claim 23, wherein said electric power source connector is a utility power plug.*

*25. The electronic charging apparatus of claim 23, wherein said electric power source connector is a male universal serial bus connector.*

*26. The electronic charging apparatus of claim 23, wherein said electronic circuit is operable to control recharging of a battery of an electronic device.*

*27. The electronic charging apparatus of claim 23, wherein said universal serial bus connector is a female universal serial bus connector.*

*28. The electronic charging apparatus of claim 23, wherein said electronic circuit comprises an electronic data hub.*

*29. The electronic charging apparatus of claim 23, wherein said battery-powered device comprises a computing device.*

*30. A method for charging battery-powered devices, comprising:*

*receiving electrical power for distribution by an electronic charging apparatus, said electronic charging apparatus comprising at least one universal serial bus connector for electrically coupling to at least one battery-powered device;*

*supplying electrical power for charging said battery-powered device from an electrical power source via said universal serial bus connector; and*

*controlling said electrical power for charging said battery-powered device to an appropriate power level by circuitry resident in said electronic charging apparatus.*

*31. The method of claim 30, wherein a host device is electrically coupled to said electronic charging apparatus and further comprising communicating data between said battery-powered device and said host device using said universal serial bus connector.*

*32. The method of claim 30, wherein said electrical power is supplied from a utility power outlet.*

*33. The method of claim 32, wherein said electronic charging apparatus comprises a power connector to receive said electrical power from said outlet.*

*34. A system for charging a rechargeable battery-powered portable electronic device, comprising:*

*an electronic charging enclosure for electrically coupling with an electrical power source and comprising an electronic circuit and at least one universal serial bus connector, said electronic charging enclosure for supplying battery charging power, wherein said electronic circuit is enabled to control said battery charging power; and*

*a rechargeable battery-powered electronic device electrically coupled with said electronic charging enclosure and wherein said rechargeable battery-powered portable electronic device is enabled to accept said battery charging power from said electronic charging enclosure by said at least one universal serial bus connector.*

*35. The system of claim 34 further comprising a cable electrically coupled with said electronic charging enclosure and for accepting power from said at least one universal serial bus connector and wherein said rechargeable battery-powered electronic device is electrically coupled with said electronic charging enclosure via said cable.*

*36. The system of claim 35, further comprising a computer network.*

*37. The system of claim 35, wherein said electrical power source is a utility power outlet.*

*38. The system of claim 35, wherein said electrical power source is a computer.*

*39. The system of claim 35, wherein said battery charging power is at a universal serial bus voltage.*

*40. The system of claim 35, wherein said rechargeable battery-powered electronic device is a laptop computer.*

*41. The system of claim 35, wherein said rechargeable battery-powered electronic device is a portable computer peripheral device.*

*42. The system of claim 35, wherein said electronic charging enclosure is enabled to communicate data between said at least one universal serial bus connector and a host computer coupled to said electronic charging enclosure.*

*43. The system of claim 35, wherein said electronic charging enclosure is a computer network hub.*

*44. The system of claim 35, wherein said electronic charging enclosure further comprises a connector for coupling to a host computer.*

*45. An apparatus comprising:*

*a housing;*

*an electrical power source connector for connecting to a source of electrical power and coupled to said housing;*

*universal serial bus connector coupled to said housing and electrically coupled to said electrical power source connector, said universal serial bus connector operable to supply electrical power for recharging a battery; and*

*an electronic circuit coupled to said universal serial bus connector and said electrical power source connector, wherein said electronic circuit is enabled to control said recharging of said battery.*

*46. The apparatus of claim 45, wherein said electrical power source connector is a utility wall outlet connector.*

*47. The apparatus of claim 45, wherein said electrical power source connector is operable to connect with an electronic transformer.*

*48. The apparatus of claim 45, wherein said battery is disposed within a portable electronic device.*

*49. The apparatus of claim 45, wherein said universal serial bus connector is a female style connector.*

*50. The apparatus of claim 45, wherein said universal serial bus connector is a male style connector.*

* * * * *

UNITED STATES PATENT AND TRADEMARK OFFICE

CERTIFICATE OF CORRECTION

PATENT NO. : RE42,385 E
APPLICATION NO. : 11/219294
DATED : May 24, 2011
INVENTOR(S) : Yoon Kean Wong et al.

It is certified that error appears in the above-identified patent and that said Letters Patent is hereby corrected as shown below:

In column 7-8, line 67 (col. 7) & line 1 (col. 8), in Claim 14, delete "pluralty" and insert -- plurality --, therefor.

Signed and Sealed this
Twelfth Day of June, 2012

David J. Kappos

David J. Kappos
*Director of the United States Patent and Trademark Office*